United States Patent
Gutta et al.

(10) Patent No.: US 6,737,963 B2
(45) Date of Patent: May 18, 2004

(54) DRIVER TAILGATING AND FOLLOWING AID

(75) Inventors: Srinivas Gutta, Buchanan, NY (US); Miroslav Trajkovic, Ossining, NY (US); Antonio Colmenarez, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 45 days.

(21) Appl. No.: 09/822,432

(22) Filed: Mar. 30, 2001

(65) Prior Publication Data

US 2002/0140551 A1 Oct. 3, 2002

(51) Int. Cl.⁷ .................................................. B60Q 1/00
(52) U.S. Cl. ........................ 340/435; 701/45; 180/271; 348/148; 348/161; 342/70; 342/71; 342/72
(58) Field of Search ................................. 340/435, 436, 340/903, 932; 701/301, 45; 348/143, 148, 161; 180/271, 275, 250

(56) References Cited

U.S. PATENT DOCUMENTS

| | | | | |
|---|---|---|---|---|
| 5,249,157 A | * | 9/1993 | Taylor | 340/903 |
| 5,355,118 A | * | 10/1994 | Fukuhara | 340/435 |
| 5,357,438 A | * | 10/1994 | Davidian | 340/436 |
| 5,410,304 A | * | 4/1995 | Hahn et al. | 340/903 |
| 5,585,798 A | * | 12/1996 | Yoshioka et al. | 342/70 |
| 5,631,639 A | * | 5/1997 | Hibino et al. | 340/903 |
| 5,642,093 A | | 6/1997 | Kinoshita et al. | 340/439 |
| 5,754,099 A | * | 5/1998 | Nishimura et al. | 340/435 |
| 5,806,019 A | * | 9/1998 | Ishiyama | 701/300 |
| 5,888,074 A | * | 3/1999 | Staplin et al. | 340/576 |
| 5,948,035 A | * | 9/1999 | Tomita | 701/70 |
| 5,949,331 A | | 9/1999 | Schofield et al. | 340/461 |
| 6,014,608 A | | 1/2000 | Seo | 701/207 |
| 6,057,754 A | | 5/2000 | Kinoshita et al. | 340/435 |
| 6,111,498 A | | 8/2000 | Jobes, I et al. | 340/438 |
| 6,114,951 A | | 9/2000 | Kinoshita et al. | 340/436 |
| 6,119,068 A | * | 9/2000 | Kannonji | 701/301 |
| 6,301,440 B1 | * | 10/2001 | Bolle et al. | 348/229 |
| 6,330,507 B1 | * | 12/2001 | Adachi et al. | 701/96 |
| 6,385,529 B1 | * | 5/2002 | Minowa et al. | 701/300 |
| 6,614,387 B1 | * | 9/2003 | Deadman | 342/70 |

FOREIGN PATENT DOCUMENTS

| | | |
|---|---|---|
| WO | WO 00/18594 | 4/2000 |
| WO | WO 00/38949 | 7/2000 |

* cited by examiner

Primary Examiner—Benjamin C. Lee
(74) Attorney, Agent, or Firm—John Vodopia

(57) ABSTRACT

A tailgating safety system for a vehicle includes a distance determiner for determining a distance of the vehicle from objects which are leading or following the vehicle. The system also includes a speedometer for determining a speed of the vehicle and an alarm. If the speed of the vehicle is greater than a predetermined speed, and the distance of the vehicle from another object is less than a predetermined distance, then the alarm is activated to advise the driver that at the speed the vehicle is traveling, the distance between the vehicle and the object is not a safe traveling distance.

20 Claims, 2 Drawing Sheets

DRIVER TAILGATING AND FOLLOWING AID

FIELD OF THE INVENTION

This invention relates to vision systems for vehicles, and more particularly relates to a vehicular vision system which provides a driver of a vehicle with information regarding vehicles that are proximate the driver's vehicle.

BACKGROUND INFORMATION

A major cause of driving accidents is a driver's inability to recognize the proximity of another vehicle to the driver's vehicle and that the driver is in an unsafe situation which requires the driver's full attention. These unsafe driving situations typically occur when the driver is following too closely to a vehicle which is in front of the driver or when another vehicle is following the driver's vehicle too closely.

Most drivers do not fully appreciate that as the speed of the vehicle increases, the following distance should also increase to provide sufficient time to react to an event. That is, the faster a vehicle is traveling, the more driving distance (safe distance between vehicles) is needed in order to take appropriate action (i.e., stop the vehicle, swerve, etc.) to avoid an accident.

It would therefore be beneficial to have a vehicular vision system which provides a driver of a vehicle with information regarding vehicles that are proximate the driver's vehicle, and identify situations which may be unsafe by taking into account the distance of the driver's vehicle from other vehicles which are in front of or behind the driver's vehicle, and by taking into account the speed of travel of the driver's vehicle.

OBJECTS AND SUMMARY OF THE INVENTION

It is therefore an object of the present invention to provide a vehicular warning system which provides a driver of a vehicle with a warning that the driver is following too closely to the car which is in front of the driver's vehicle.

It is another object of the present invention to provide a vehicular warning system which provides the driver of a vehicle with a warning that a vehicle which is following the driver's vehicle is following too closely.

It is yet another object of the present invention to provide an alarm which advises the driver of an unsafe following distance.

It is a further object of the present invention to provide a vehicular warning system which takes into account the driver's reaction time when determining whether an unsafe driving situation exists.

In accordance with one form of the present invention, a vehicular warning system includes a distance determiner for determining a distance of the vehicle from objects which are leading or following the vehicle, a speedometer for determining a speed of the vehicle, and an alarm, wherein if the speed of the vehicle is greater than a predetermined speed, and the distance of the vehicle from another object is less than a predetermined distance, then the alarm is activated to advise the driver that at the speed the vehicle is traveling, the distance between the vehicle and the object is not a safe traveling distance.

A preferred form of the vehicular warning system as well as other embodiments, objects, features, and advantages of this invention will be apparent in the following detailed description of illustrative embodiments thereof, which is to be read in connection with the accompanying drawings.

DETAILED DESCRIPTION OF THE PREFERRED EMBODIMENT

Figure 1:
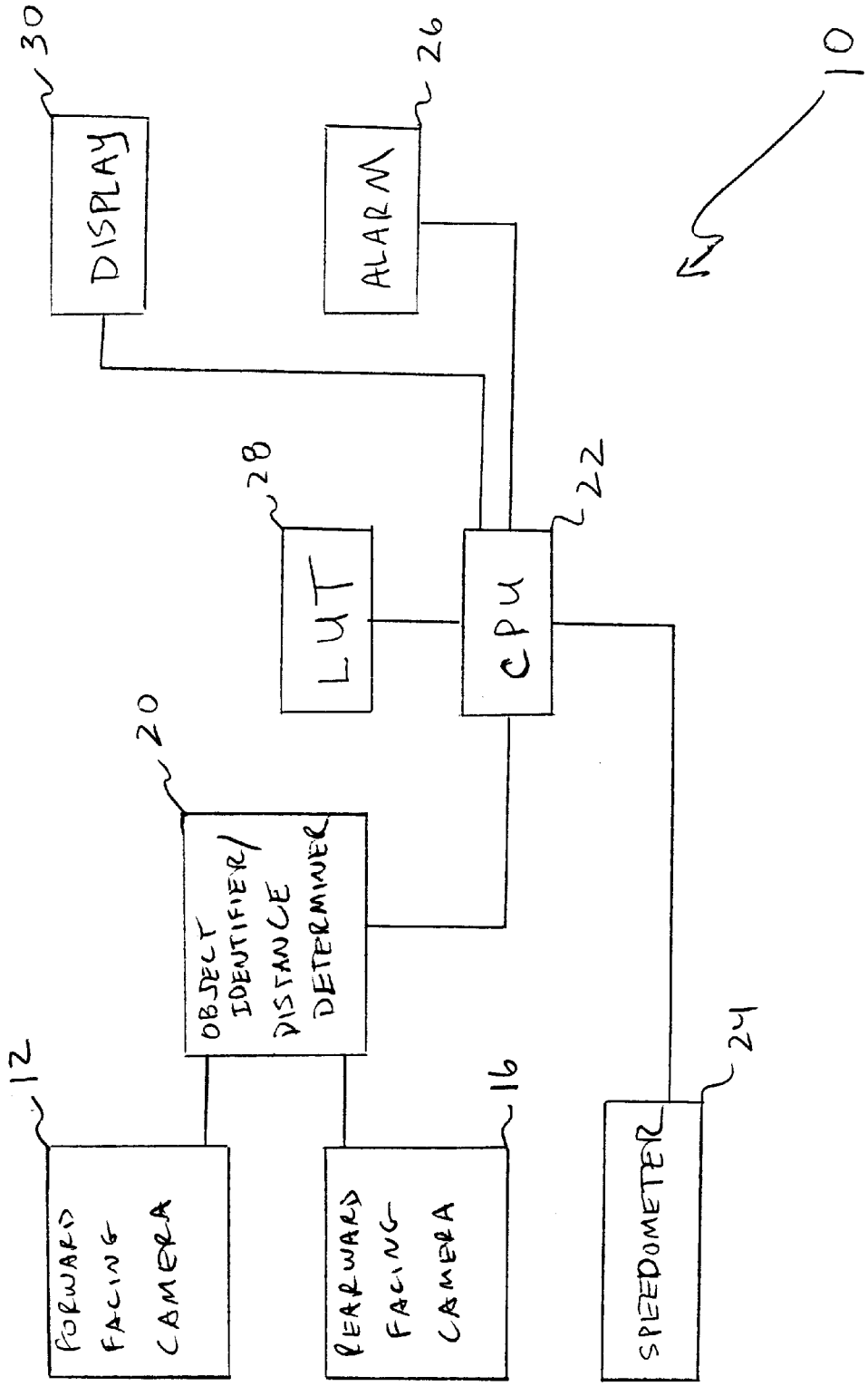
FIG. 1 is a block diagram of the tailgating safety system for a vehicle according to the present invention.
Figure 2:
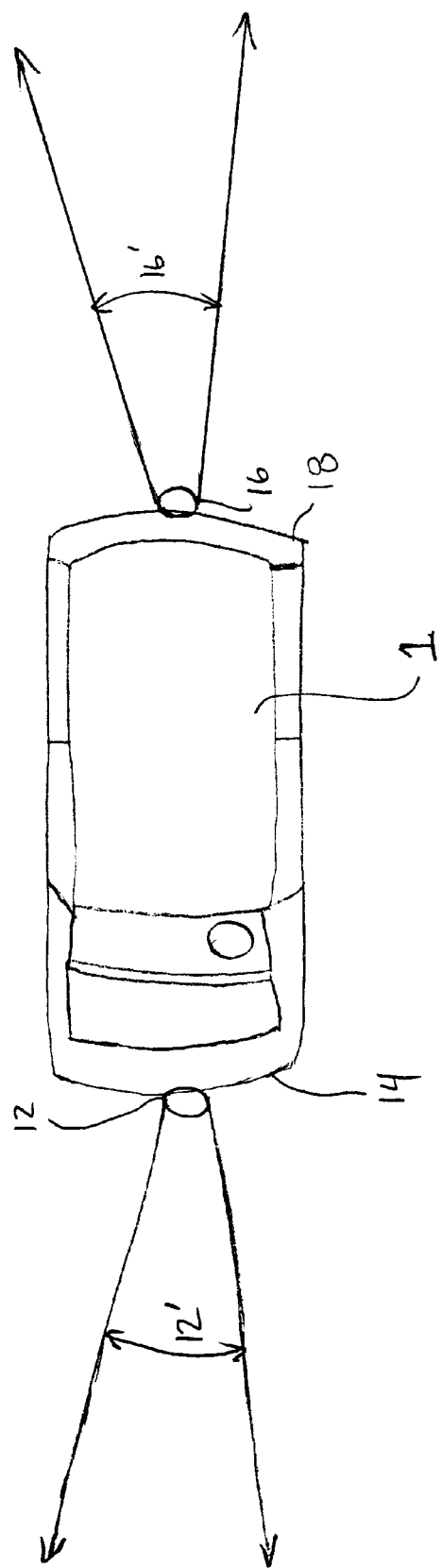
FIG. 2 is a top plan view of a vehicle having the tailgating safety system according to the present invention.

Referring now to FIG. 1, a preferred embodiment of the tailgating safety system 10 for a vehicle 1 according to the present invention is shown. The system preferably includes a forward facing camera 12 which is positioned on a front portion 14 of the vehicle. The camera 12 is preferably positioned so as not to interfere with the driver's forward field of view. The system also includes a rearward facing camera 16 which is preferably positioned on a rear portion 18 of the vehicle and which is oriented in a direction opposite the forward direction of travel of the vehicle. The cameras 12, 16, preferably capture images of vehicles on the roadway which are directly in front of or directly behind the driver's vehicle. As a result, the field of view 12', 16' of each camera 12, 16 may be relatively narrow. A suitable camera for use as the forward facing camera 12 or rearward facing camera 16 is disclosed in U.S. Pat. No. 6,114,951 to Kinoshita et al, the entire disclosure of which is incorporated herein by reference.

Coupled to the forward facing camera 12 and rearward facing camera 16 is an object identifier/distance determiner 20 which has as an input signal the image signals generated by the forward facing camera and rearward facing camera. The object identifier/distance determiner 20 analyzes the image signals which are provided thereto to determine whether a vehicle such as a car, truck, van, bus, motorcycle, sport utility and the like is in the field of view of either camera. If it is determined that a vehicle is in the field of view of either camera, the distance of that identified vehicle from the driver's vehicle is determined.

In the preferred embodiment the identification of the vehicle occurs by extraction and classification. The extraction of objects from the field of view is accomplished in accordance with any of a number of well-known methods, such as the methods described in Segmentation and Tracking Using Color Mixture Models, by Yogesh Raja, Stephen J. McKenna and Shaogang Gong, Proceedings of the $3^{rd}$ Asian Conference on Computer Vision, Vol. 2, pp. 607–614, Hong Kong, China, 1998; and Statistical Foreground Modelling for Object Localization, by Josephine Sullivan, Andrew Blake and Jens Rittcher, Proceedings of the $6^{th}$ European Conference on Computer Vision, Vol. 2, pp. 307–323, Dublin, Ireland, 2000, the entire disclosures of which are incorporated herein by reference.

Once the objects have been extracted, then classification of each object is performed. Classification can be performed in accordance with any of a number of well-known methods. In the preferred embodiment classification refers to providing descriptive information of the object extracted from the image generated by the cameras. The identification may be as simple as saying that the object is a car, bus, motorcycle, sport utility, minivan or truck. These methods are known to persons skilled in the art. A preferred method for classifying objects is described in U.S. Ser. No. (unassigned) to Gutta et al entitled "Classification of Objects through Model Ensembles" filed Feb. 27, 2001; and "Pedestrian Tracking from a Moving Vehicle", by Vasanth Philomin, Ramani Duraiswami and Larry Davis, Proceedings of the IEEE Intelligent Vehicles Symposium, Vol. 1, pp. 350–355, Dearborn, USA, 2000, the entire disclosures of which are incorporated herein by reference. While the later above-identified reference discusses tracking and classification of pedestrians, the same system can be extended to classification of vehicles by a person of ordinary skill in the art.

As mentioned previously, the present invention also determines the distance of each object which is in the field of view of the cameras from the driver's vehicle. Many systems known to persons skilled in the art can provide the relative distance of an object from a vehicle such as a radar or sonar type system wherein a signal is transmitted to the object and returned to the transmitter for determination of the relative distance, and stereo cameras or a single camera wherein the images acquired from the cameras are analyzed to determine the distance of the object from the vehicle such as that disclosed in U.S. Pat. No. 5,633,705 to Asayama, entitled "Obstacle Detecting System For a Motor Vehicle"; and U.S. Pat. No. 5,304,980 to Maekawa entitled "Distance Detecting Apparatus For A Vehicle"; and U.S. Pat. No. 5,307,136 to Saneyoshi entitled "Distance Detection System For Vehicles", the entire disclosures of which are incorporated herein by reference. In the preferred embodiment, the distance determiner analyzes the images obtained by the camera 12, 16 to determine the distance of each object from the vehicle.

Coupled to the object identifier/distance determiner is a CPU 22. The CPU receives as an input signal the output of the object identifier/distance determiner 20 which indicates whether an object is identified as being within the field of view of either the forward facing camera or the rearward facing camera, and the distance of the object from the driver's vehicle. The system also includes a speedometer 24 which provides an indication of the speed of travel of the driver's vehicle. Coupled to the CPU is an alarm 26 which is responsive to actuation by the CPU. The alarm may be an audible alarm, visual alarm or tactile alarm for providing an indication to the driver that either the driver is following a vehicle in front of his vehicle too closely, or that a vehicle is following the driver's vehicle too closely. This determination is made based on the speed of travel.

The CPU 22 preferably monitors the input signals provided by the speedometer 24 and object identifier/distance determiner 20 and determines whether a dangerous driving condition (following another vehicle too closely) is present. The CPU determines based on the current speed of the driver's vehicle what a safe following distance is. This information is preferably stored in a memory such as a look-up table 28. Based on the speed of the driver's vehicle, the CPU compares the actual distance of the driver's vehicle from the object identified by either the forward or rearward facing camera as compared to the safe driving distance. If the distance between the driver's vehicle and the object found in the field of view of either the forward facing camera 12 or rearward facing camera 16 is less than the recommended safe driving distance, then the CPU actuates the alarm 26 to advise the driver that at the speed the vehicle is currently traveling, the distance between the driver's vehicle and the vehicle in the field of view of either the forward facing camera or rearward facing camera is not a safe traveling distance. The driver is advised to therefore reduce his speed of travel or to change lanes.

In an alternative embodiment of the invention, the system may also include a display 30 which displays the current speed of the driver's vehicle and the recommended following distance for that speed, along with the distance between the vehicles in front of the driver's vehicle and the vehicle following the driver's vehicle. Based on the information provided on the display, the driver may take specific action. For example, if the driver is advised that he is following too closely to the vehicle in front of the driver's vehicle, the driver can brake to provide more distance between the two vehicles or he can change lanes. If the driver is advised that the vehicle following the driver's vehicle is following too closely, the driver can accelerate to provide more distance between the two vehicles, or he can change lanes. It is also foreseen that the system could be coupled to the brakes or the accelerator to automatically reduce the vehicle's speed to provide a safer following distance, or increase the vehicle's speed to provide a greater distance between the driver's vehicle and the vehicle that is following the driver's vehicle.

It is foreseen that the present invention could also monitor the driver's reaction time to move his foot from the accelerator to the brake pedal in order to provide a better indication of the driver's ability to take action and therefore to customize the safe following distance for the driver. For example, if the driver is an elderly person who has very slow reaction time for moving his foot from the accelerator to the brake pedal, then a greater following distance or a slower speed may be preferred to provide a safer distance between vehicles. This alternative feature has problems in that factors which may not be measured by the system which would slow a driver's reaction time may not be taken into account. For example, if the driver is very tired or has injured his foot or leg, the driver's reaction time may be increased and therefore the system may provide a false indication to the driver that a safe following distance between vehicles is present. As a result, it is preferred that the system be based upon standard safe following distances between cars which are not based upon individual driver reaction times.

It is also foreseen that the system could monitor the weather conditions and road conditions (i.e., wet, ice, snow, etc.) to provide modified safe following distances which are stored in the look-up table. That is, if the roadway is wet or contains ice or snow, then greater following distances between vehicles would be desired. It is also foreseen that the system could monitor the braking capabilities of the vehicle and if it lab is discovered that the vehicle has less than maximum braking capabilities, then a greater following distance for the driver's vehicle would be desired.

Although illustrative embodiments of the present invention have been described with reference to the accompanying drawings, it is to be understood that the present invention is not limited to those precise embodiments and various modifications may be made by persons of ordinary skill in the art without departing from the scope and spirit of the invention.

What is claimed is:

1. A tailgating safety system for a vehicle comprising:
an object identifier for visually identifying an object in front or behind the vehicle, and for determining whether the identified object is a vehicle;
a distance determiner for determining a distance of the vehicle from an identified vehicle;
a speedometer for determining a speed of the vehicle;
a Central Processing Unit (CPU);
a look-up table, whereby said CPU looks up a safe distance from the vehicle to the identified vehicle based on the determined speed of the vehicle; and
a monitoring unit for monitoring the reaction time of a driver of the vehicle;

wherein said CPU will change the looked-up safe distance to a greater distance if the monitoring unit detects a slow reaction time.

2. The tailgating safety system of claim 1, further comprising:
a display showing the driver the determined distance of the vehicle from the identified vehicle, the current speed of the driver's vehicle, and the recommended safe distance from the identified vehicle, and warning the driver if there is an unsafe distance is present in a forward or rearward direction of travel of the vehicle.

3. The tailgating safety system of claim 1, wherein the system is coupled to a braking mechanism of the vehicle of the driver such that after actuation of an alarm, the system actuates the braking system to reduce the speed of the vehicle of the driver, wherein said alarm is actuated by the CPU when the CPU determines that an identified vehicle located forward in the direction of travel is an unsafe distance from the vehicle.

4. The tailgating safety system of claim 3, wherein the system actuates the braking system of the vehicle of the driver at a predetermined time interval after actuation of an alarm, wherein said alarm is actuated by the CPU when the CPU determines that an identified vehicle located forward in the direction of travel is an unsafe distance from the vehicle.

5. The tailgating safety system of claim 1, further comprising:
an alarm which is responsive to actuation by the CPU when the CPU determines that an identified vehicle is at an unsafe distance.

6. The tailgating safety system of claim 5, wherein the alarm comprises at least one of an audible alarm, a visual alarm, and a tactile alarm.

7. The tailgating safety system of claim 1, wherein the CPU activates an alarm if it is determined that (i) the determined speed of the vehicle is greater than a predetermined speed, and (ii) the determined distance from the vehicle to the identified vehicle is less than a predetermined distance.

8. The tailgating safety system of claim 1, wherein the CPU activates an alarm if it is determined that the determined distance from the vehicle to the identified vehicle is one of about equal to or less than the looked-up safe distance.

9. The tailgating safety system of claim 1, wherein the monitoring means comprises:
means for monitoring a time in which it takes the driver to move a foot of the driver from an accelerator pedal to a brake pedal.

10. The tailgating safety system of claim 1, further comprising at least one of:
means for actuating a braking mechanism of the vehicle in order to automatically reduce a speed of the vehicle, wherein said braking actuating means can be activated by the CPU; and
means for actuating an accelerator of the vehicle in order to automatically increase a speed of the vehicle, wherein said accelerator actuating means can be activated by the CPU.

11. The tailgating safety system of claim 10, wherein system comprises both the braking actuating means and the accelerator actuating means.

12. The tailgating safety system of claim 10, wherein the at least one actuating means actuates after actuation of an alarm, wherein said alarm is actuated by the CPU when the CPU determines that the determined distance of an identified vehicle is one of about equal to or less than the looked-up safe distance.

13. The tailgating safety system of claim 1, further comprising:
means for monitoring braking capabilities of the vehicle;
wherein the CPU will change the looked-up safe distance to a greater distance if the braking capability monitoring means detects a less than maximum braking capability.

14. The tailgating safety system of claim 1, further comprising:
means for monitoring at least one of weather and road conditions;
wherein the CPU will change the looked-up safe distance to a greater distance if the at least one of weather and road condition monitoring means detects poor driving conditions.

15. The tailgating safety system of claim 1, further comprising:
at least one camera positioned on the vehicle, wherein the at least one camera is coupled with at least one of the object identifier and the distance determiner.

16. The tailgating safety system of claim 15, wherein the object identifier is coupled to the at least one camera, and the object identifier analyzes image signals provided by the at least one camera to determine whether a vehicle is in a field of view of the at least one camera.

17. The tailgating safety system of claim 16, wherein the object identifier determines whether a vehicle is in a field of view of the at least one camera by extracting objects in the field of view, and then classifying the extracted objects.

18. The tailgating safety system of claim 15, wherein the distance determiner is coupled to the at least one camera, and the distance determiner analyzes image signals provided by the at least one camera to determine a distance to a vehicle in a field of view of the at least one camera.

19. A method for identifying an unsafe distance between a vehicle and another vehicle comprising the steps of:
identifying another vehicle in front or behind the vehicle;
determining a distance from the vehicle to an identified vehicle;
determining a present speed of the vehicle;
looking up a safe distance in a look-up table using the determined present speed;
monitoring a reaction time of a driver of the vehicle in order to determine if the driver has a slow reaction time;
adding to the looked-up safe distance if it is determined that the driver has a slow reaction time;
determining whether the determined distance of an identified vehicle is one of about equal to or less than the looked-up safe distance; and
performing a safety action if it is determined that the determined distance of an identified vehicle is one of about equal to or less than the looked-up safe distance.

20. The method of claim 19, wherein the step of monitoring a reaction time of a driver comprises the step of:
monitoring a time in which it takes the driver to move a foot of the driver from an accelerator pedal to a brake pedal.

* * * * *